(12) United States Patent
Huang et al.

(10) Patent No.: US 8,943,888 B2
(45) Date of Patent: Feb. 3, 2015

(54) MICROMACHINED FLOW SENSOR INTEGRATED WITH FLOW INCEPTION DETECTION AND MAKE OF THE SAME

(71) Applicants: Liji Huang, San Jose, CA (US); Chih-Chang Chen, Cupertino, CA (US)

(72) Inventors: Liji Huang, San Jose, CA (US); Chih-Chang Chen, Cupertino, CA (US)

(73) Assignee: M-Tech Instrument Corporation (Holding) Limited, Hong Kong (HK)

( * ) Notice: Subject to any disclaimer, the term of this patent is extended or adjusted under 35 U.S.C. 154(b) by 267 days.

(21) Appl. No.: 13/737,784

(22) Filed: Jan. 9, 2013

(65) Prior Publication Data
US 2014/0190251 A1 Jul. 10, 2014

(51) Int. Cl.
G01F 1/68 (2006.01)
G01F 1/688 (2006.01)

(52) U.S. Cl.
CPC .................................. *G01F 1/6888* (2013.01)
USPC ...................................................... 73/204.24

(58) Field of Classification Search
USPC ................. 73/204.26, 204.15, 204.27, 23.42, 73/204.24
See application file for complete search history.

(56) References Cited

U.S. PATENT DOCUMENTS

| | | | |
|---|---|---|---|
| 7,119,550 B2 * | 10/2006 | Kitano et al. ................. | 324/658 |
| 2010/0242604 A1 * | 9/2010 | Sammoura et al. ........ | 73/514.34 |
| 2011/0192229 A1 * | 8/2011 | Chen et al. ................. | 73/514.32 |

* cited by examiner

*Primary Examiner* — Jewel V Thompson

(57) ABSTRACT

This invention is related to a microfabricated microelectro-mechanical systems (a.k.a. MEMS) silicon thermal mass flow sensor integrated with a micromachined thermopile temperature sensor as a flow inception detection sensor. The micromachined thermopile sensor is used to detect the inception of mass flow and therefore to trigger the operation of mass flow sensor from its hibernating mode. By this method, the battery-operated flow speed measuring apparatus can save great deal of electricity and significantly extend the life span of battery. A new design of micromachined thermopile sensor with serpentine shape is used to reduce the complexity of microfabrication process and to increase the flexibility and options for material selection. In order to enhance the sensitivity of the thermopile temperature sensor, a method to maximize the quantity of the junctions is provided as well.

14 Claims, 6 Drawing Sheets

Figure 1:
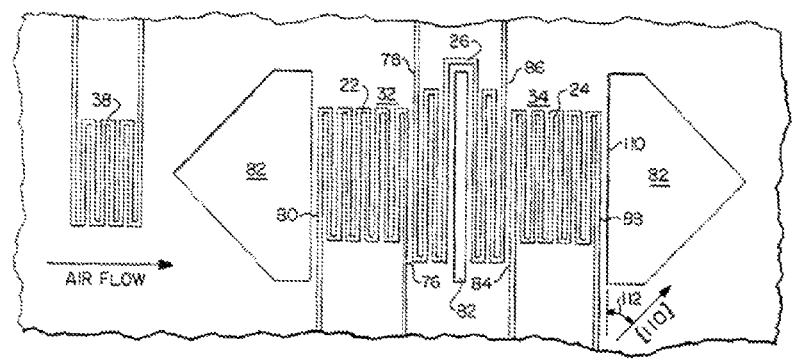

MICROMACHINED FLOW SENSOR INTEGRATED WITH FLOW INCEPTION DETECTION AND MAKE OF THE SAME

We claim the priority to U.S. provisional application Ser. No. 61585777, filed on Jan. 12, 2012.

BACKGROUND OF THE INVENTION

1. Field of the Invention

Currently, most prevailed gas flow meters for residential application are the conventional mechanical diaphragm meter which is based on the volume measurement principle. The conventional mechanical diaphragm meter is naturally lacked of the functionality of temperature compensation due to its limitation of measurement principle. The commencement of modern technology of micromachined thermal micro-electro-mechanical-system (a.k.a. MEMS) flow sensor has opened up the opportunities to measure the mass flow of gas in a more precise way with temperature compensation advantage. In addition to the advantages of measurement precision, the micromachined thermal MEMS flow sensor can also provide other merits of functionalities such as wireless accessibility for meter reading and data transmission. However, a major limiting factor to prevail the MEMS flow sensor technology in residential gas meter application is its battery-operating requirement and long lifespan on field deployment, the first factor of which is oppositely not necessary for conventional mechanical meters. As a result, the lifespan of the battery had become the bottle neck and significantly suppressed the feasibility and provability of MEMS thermal mass flow sensor in residential flow meter application.

2. Description of the Related Art

A prior art disclosed by Robert E. Higashi (Flow sensor, U.S. Pat. No. 4,501,144) teaches a micromachined silicon thermal mass flow sensor that had two resistance temperature detector (RTD) located on the upstream and downstream of a heater resistor respectively to measure the temperature difference and calibrated as the flow speed measurement (see the FIG. 1). If this type of mass flow sensor is attempted to apply on the residential natural gas metering, the feasibility of using battery as external power source will become impossible since the battery would not meet the minimum lifespan requirement because the heater and the RTD all need electricity power to maintain its functionality even in a no gas flow situation.

Another previous disclosure of art by Marc von Waldkirch al. (Flow sensor with Thermocouples, U.S. Pat. No. 8,011,240) teaches a flow sensor that includes two arranged thermopiles to measure the gas flow speed using the calorimetric thermal mass flow measurement principle. The two thermopiles are utilized to measure temperature difference in the upstream and downstream positions of a heater. In this type of the flow sensor, the whole measuring apparatus could be turned off during no flow situation to save electrical power. However, once the gas flow starts, the self-generated voltage of thermopile due to the temperature variation by gas flow can trigger the system and turn the power back on of the measuring apparatus. Yet, as seen from the FIG. 2, because temperature measurement for thermopiles is limited to the hot junctions on the membrane, therefore its measurement accuracy would be inferior to the Higashi's device. In Waldkirch's embodiment, the temperature measurement is an average of a line integral along the junction points, but in Higashi's invention, the temperature measurement is an average of area integral which is naturally more precise in measurement accuracy. Another disadvantage for thermopile type thermal flow sensor is its shorter dynamical range compared to the RTD type due to same reason as above.

In the current invention, in order to increase the lifespan of battery and overcome the disadvantage of a pure thermopile type of thermal flow sensor, a micromachined thermopile sensor is separately integrated with a micromachined thermal mass flow sensor. As in the idle period of no gas flow, the power of the thermal mass flow sensor and other control circuits will be turned off to save the electrical power of battery, and once the thermopile sensor has detected the inception of gas flow motion, it will trigger the flow sensor from its hibernating mode to start flow measurement operation. The micromachined thermopile sensor can self-generate a voltage output with no need of external power consumption once a temperature variation is detected; therefore it is a perfect candidate as a flow inception detector for battery-operated flow sensor.

SUMMARY OF THE INVENTION

It is therefore an object of the present invention to solve the above issues. A micromachined thermopile sensor is integrated with the micromachined silicon thermal mass flow sensor as a flow inception detection sensor. Because of the large thermal mass of conventional wire-type thermocouples, they are difficult to utilize as sensitive temperature detectors. The thermopile temperature sensor is fabricated by micromaching and thin film technology. The micromachined thermopile temperature sensor includes numbers of thermocouples which are connected in series to generate a signal output from detecting a slight temperature distribution variation caused by the flow motion.

In the current invention, the thermopiles junctions are formed by an array of two dissimilar metals, or alloys that have high thermo-effects in two opposite polarity. Each of the junctions can produce a small voltage when a temperature gradient is applied. The total sum of the voltage appearing across all the junctions will therefore be the signal output. Due to the thermoelectric effect, the absorption of thermal energy by one of the thermocouple junctions, called the active junction, increases its temperature. The differential temperature between the active junction and a reference junction kept at a fixed temperature produces an electromotive force directly proportional to the differential temperature created. This thermoelectric effect is also called Seebeck effect. Every type of metal or alloys has a so-called Seebeck coefficient. The output voltage of a thermopile will be $$\Delta V_{AB} = n \times (\alpha_A - \alpha_B) \times \Delta T \quad \text{(Equation A)}$$

Where n is the number of serial thermocouples; $\alpha_A$, $\alpha_B$, are the Seebeck coefficients of two dissimilar materials (units as $\mu V/K$); $\Delta T$ is the temperature difference between the hot junction and cold junction. As we can see from the equation A, the output voltage of the thermopile temperature sensor will proportionally increase with the number of junctions and the difference of seebeck coefficient of two dissimilar metals. In order to increase the sensitivities of current thermopile invention, several optimum options of pair materials are as following:

1. Nichrome (80% Ni/20% Cr) and Nickel (Ni)

$(\alpha_A - \alpha_B) = 25 - (-15) = 40 \ (\mu V/K)$

2. Nichrome (80% Ni/20% Cr) and Constantan (55% Cu/45% Ni)

$(\alpha_A - \alpha_B) = 25 - (-35) = 60 \ (\mu V/K)$

3. Antimony (Sb) and Nickel (Ni)

$(\alpha_A - \alpha_B) = 47 - (-15) - 62 \ (\mu V/K)$

4. Antimony (Sb) and Constantan (55% Cu/45% Ni)

$(\alpha_A - \alpha_B) = 47 - (-35) - 82 \ (\mu V/K)$

In order to increase the sensitivity of the thermopile, by the special design in the current invention, the number of the thermopile junctions is as well maximized as many as possible in the limited suspending membrane by utilizing all the four edges of the suspending membrane for the hot junctions disposition. The detailed embodiment will be disclosed in the section of detailed description of the preferred embodiments.

Because the micromachined thermopiles are very tiny and having low thermal mass; therefore they can be very sensitive to precisely measure tiny temperature variation at common surrounding temperature. Furthermore, the low thermal mass of the micromachined thermopile sensor can contribute to a fast response time in a mini second level compared to the conventional thermopile sensor.

In the current invention, the active junctions of the thermopile will be disposed on a micromachined suspending membrane which is utilized to isolate the heat loss from thermal conduction thus to keep as much as possible of the received heat which is conducted from the measuring object. On the other hand, the reference junctions of the thermopile are disposed directly on the non-membrane region of the silicon substrate, which is considered as a heat sink for reference junctions to stay as ambient temperature. The thermopile junctions are formed by a new design of serpentine structure with two dissimilar metals or metal alloys. By this embodiment of serpentine structure, there is no need of dielectric insulation between two dissimilar metals, and therefore the contact holes process usually utilized to form the junctions between these two metals in other conventional thermopile sensor can be eliminated. Without the dielectric insulation layer deposition and the contact holes etching processes, the complexity of microfabrication process can be greatly reduced, which will also extensively decrease the manufacturing cost. In addition to the aforementioned advantages, the simplified process by the embodiments will also expand the options for the two dissimilar metals selections. This is because in a typical contact holes process, the dielectric insulation film has to be removed for opening the conduction pathway before the process of the second metal deposition, which is usually involved a wet or dry etching process. Sometimes, because the etching selectivity between the dielectric film and the first metal layer is not high enough, therefore the choices for the combination of dissimilar metals are greatly narrowed. By deploying the present embodiment of no contact holes process, the options to choose pair combination of dissimilar metals are widely enlarged. The embodiment of process procedure will be disclosed as well in the present invention.

BRIEF DESCRIPTIONS OF THE DRAWINGS

FIG. 1: Illustration of a prior art of a micromachined thermal mass flow sensor using RTD resistors as temperature sensing component.

Figure 2:
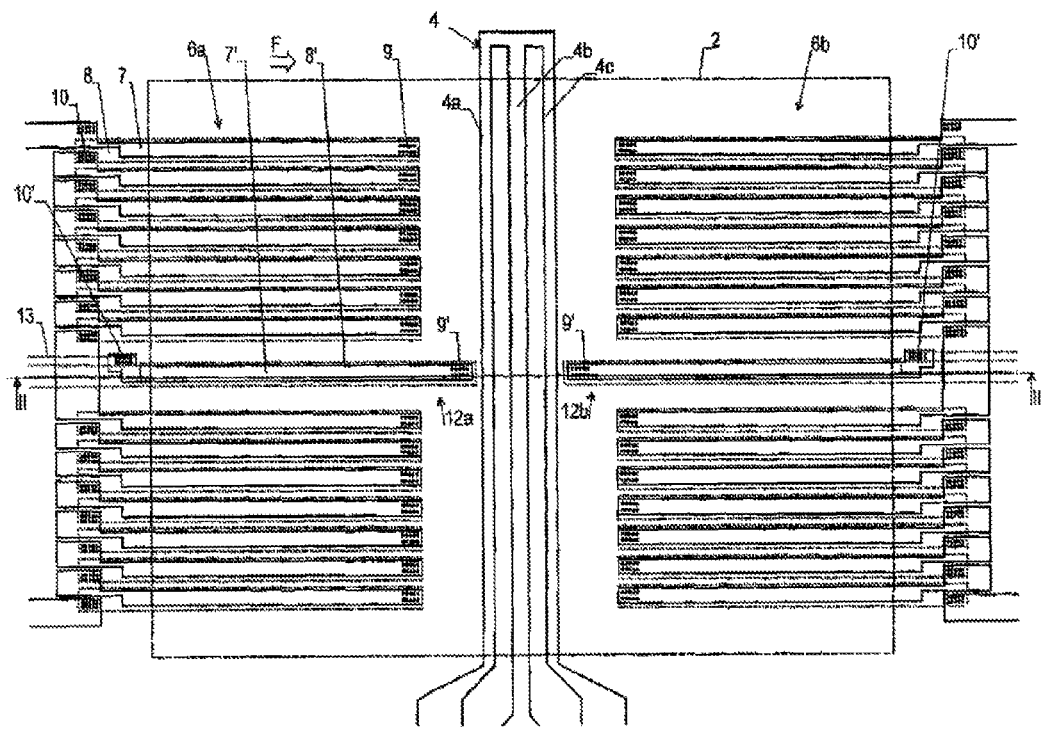

FIG. 2: Illustration of a prior art of a micromachined thermal mass flow sensor using thermopile junctions as temperature sensing component.

Figure 3:
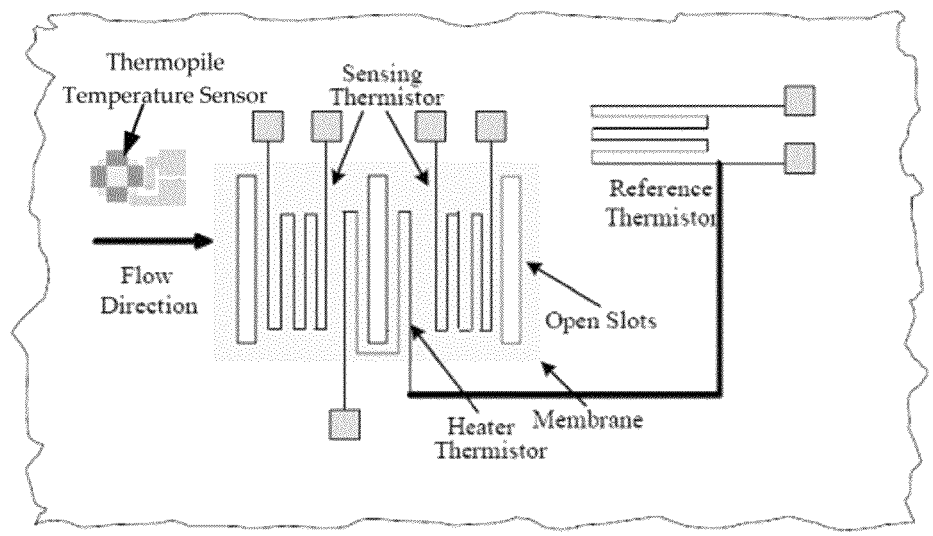

FIG. 3: Illustration of the current preferred sensor topology: top view.

Figure 4:
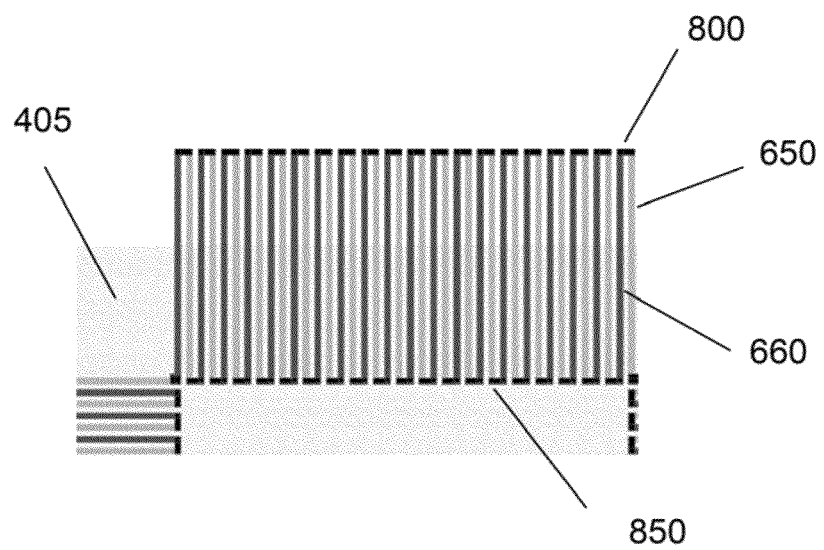

FIG. 4: Illustration of the current preferred embodiments on the structure of the thermopile junctions.

Figure 5:
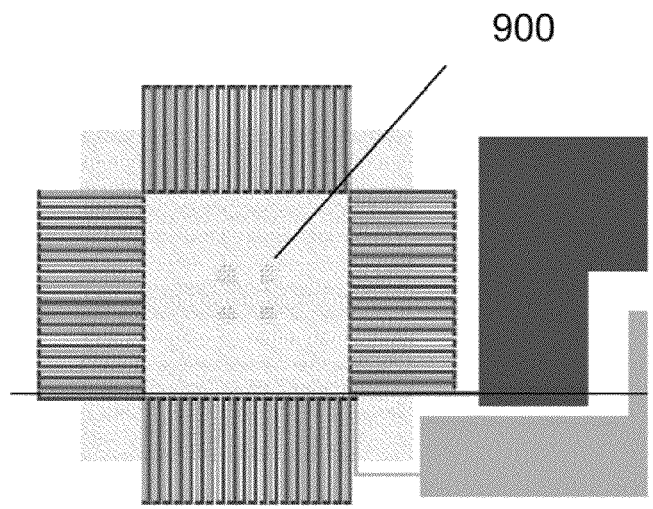

FIG. 5: Illustration of the current preferred embodiments of the arrangement to maximize the number of the thermopile junctions and the open holes on the suspending membrane of the thermopile temperature sensor.

Figure 6:
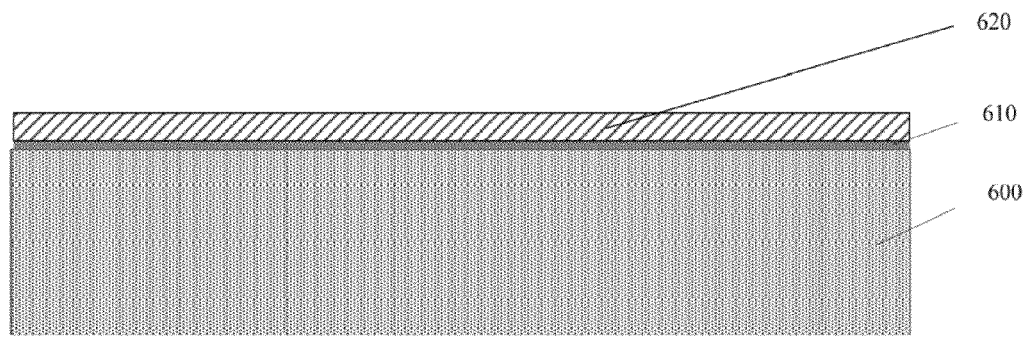
Figure 6:
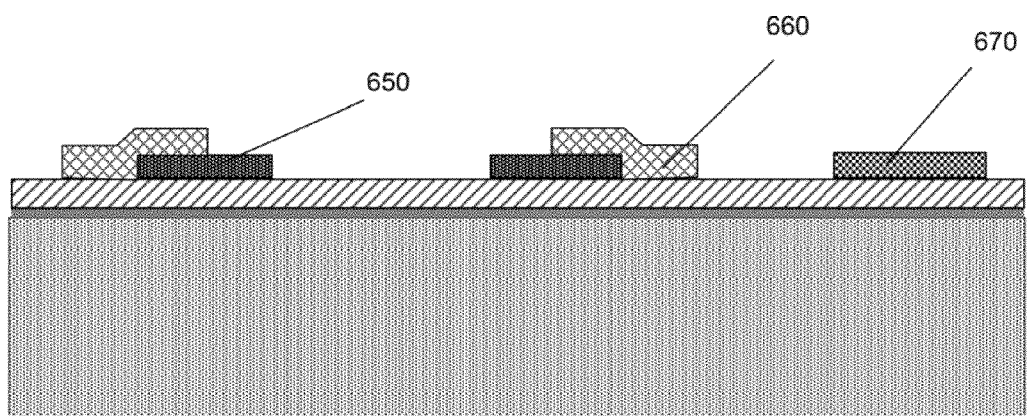
Figure 6:
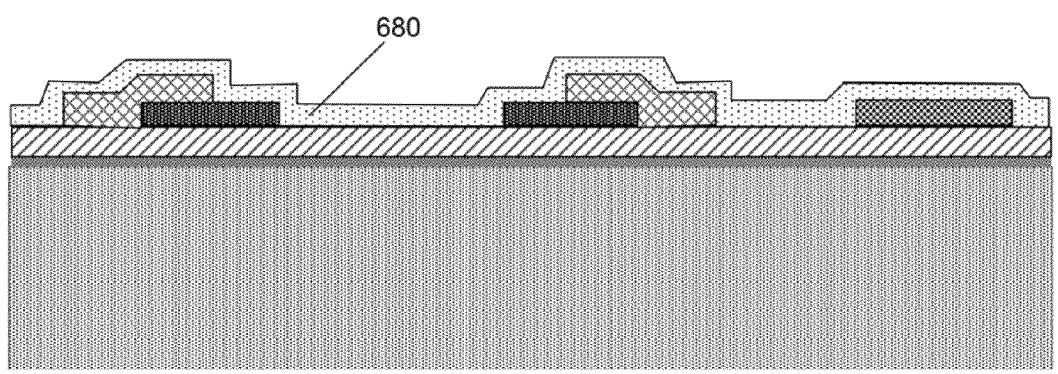
Figure 6:
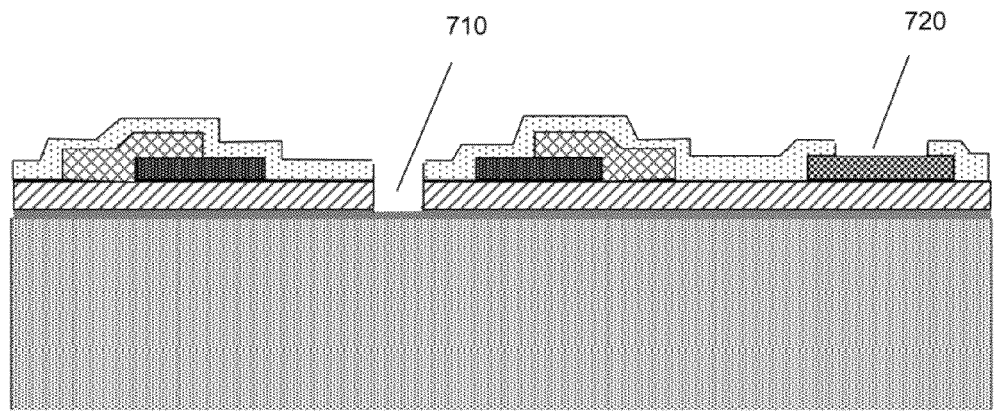
Figure 6:
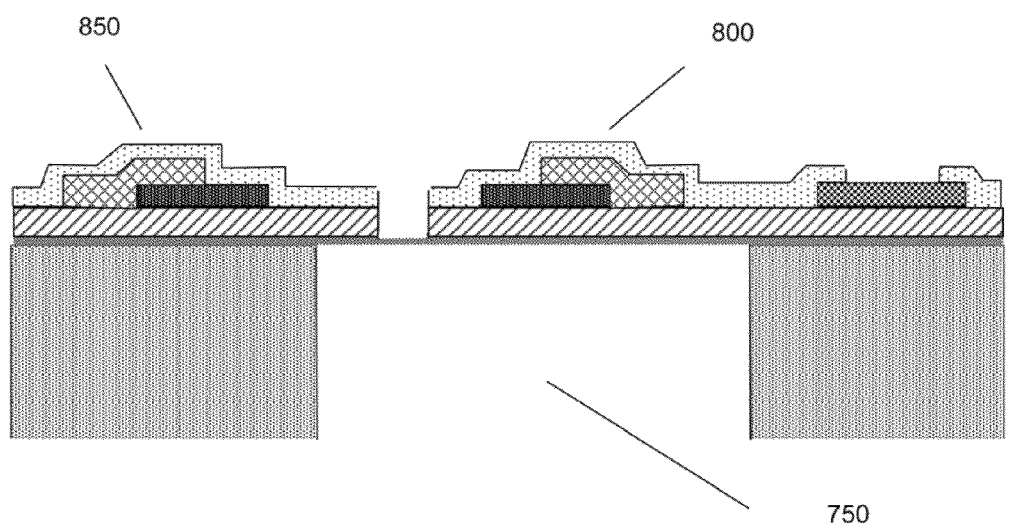
Figure 6:
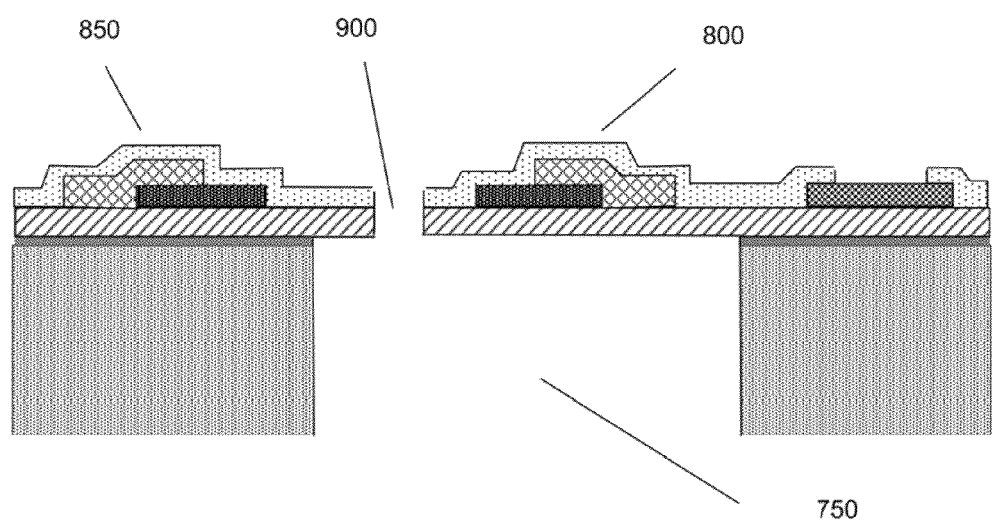

FIG. 6 (*a*) through FIG. 6 (*f*) shows a process to form the thermopile temperature sensor according to the preferred embodiment of the current invention.

DETAILED DESCRIPTION OF THE PREFERRED EMBODIMENTS

FIG. 1 illustrates a prior art which is disclosed by Robert E. Higashi (U.S. Pat. No. 4,501,144) and teaches a micromachined silicon thermal mass flow sensor that had two resistance temperature detector (RTD) respectively located on the upstream and downstream besides a heater resistor to measure the temperature difference and calibrated as the flow speed measurement. The temperature measurement besides the heater is an average results of temperature variation across the whole area of each RTD which is a plus in terms of measurement accuracy. However this type of mass flow sensor is not suitable for the residential natural gas metering, because the power for the whole system needs to be kept on even in the situation of no gas flow. As a result, the feasibility of using battery as external power source will become impossible since the battery would not meet the minimum lifespan requirement because the heater and the RTD all need electricity power to maintain its functionality even in a no gas flow situation.

FIG. 2 depicts a disclosure of prior art by Marc von Waldkirch al. (U.S. Pat. No. 8,011,240) which teaches a flow sensor that includes two arranged thermopiles to measure the gas flow speed using the calorimetric thermal mass flow measurement principle. The two thermopiles are utilized to measure temperature difference in the upstream and downstream positions related to a heater. Because the temperature measurement for thermopiles is limited on the hot junctions points on the membrane, which is along a line beside the heater, therefore its measurement accuracy would be less accurate compared to RTD type of thermal mass flow sensor. And not to mention, the measurement dynamic range is affected to be inferior as well.

FIG. 3 illustrates a top view of preferred sensor topology of the current invention. A micromachined thermopile temperature sensor is integrated but separately with a micromachined silicon thermal mass flow sensor. The thermopile temperature sensor, which is located in the upstream related to the thermal mass flow sensor, is utilized to detect the flow inception by measuring the temperature variation caused by the flow motion. The reference thermistor is used to measure the ambient temperature. The ambient temperature signal will be feedback to a closed-loop heater thermistor control circuit. The control circuit is to keep the heater temperature constantly above the ambient temperature. The sensing thermistors besides the heater thermistor are worked as the flow speed sensing elements. In an idle of no flow situation, the thermal mass flow sensor will be shut-off until it is triggered by the voltage self-generated from the thermopile temperature sensor. By this way of power management strategy, the power consumption of the flow measuring apparatus can be greatly reduced and therefore a battery-powered with reasonable lifespan measuring apparatus becomes feasible.

FIG. 4 depicts the basic structure of the preferred embodiments of the thermopile sensor in the current invention. As two dissimilar metals (for examples, 80% Nichrome and Nickel) with high difference on Seebeck coefficients have been chosen. The first dissimilar metal 650 and the second dissimilar metal 660 are patterned as serpentine shape which are interlaced cross-joined to form the junctions of 800 and 850 in the overlapping areas of two metals. The junctions 850 located on the 405 region as a suspending membrane are called active junctions. The junctions 800 which are located on outside of region 405 are functioned as reference junctions. During an idle period of no flow, the temperature on the active junctions 850 and reference junction 800 will stay in same. However, once a gas flow is commenced, the temperature on the active junction 850 will be cooled down while the reference junction 800 stay unchanged since they are thermally well-connected to the substrate as heat sink. As a result, the temperature difference between the junctions 850 and 800 will cause a change of output voltage which can be utilized as a trigger signal to initiate the operation of thermal mass flow sensor.

FIG. 5 depicts the top view of the complete structure of the preferred embodiments for thermopile sensor in the current invention. Four open holes 900 are created in the center of the suspending membrane 405, which is used to balance the gas pressure above and below the suspending membrane. This is a very critical design to avoid the breakage of the suspending membrane in a high pressure or high flow operation. In order to maximize the number of the junctions to enhance the sensitivity of the thermopile temperature sensor, a preferred embodiment is deployed by serially connecting thermopile junctions along the four sides of the suspending membrane.

The figures of FIG. 6 (a) through FIG. 4 (f) demonstrate a process for forming the micromachined thermopile temperature sensor according to the preferred embodiment of the present invention. In FIG. 6 (a), the micromachined thermopile temperature sensor is formed first by a deposition of a thermal grown silicon dioxide 610 with thickness of 2000 A to 3000 A and then a LPCVD low stress silicon nitride 620 with a thickness between 7000 A to 10000 A on a silicon wafer 600. And then in FIG. 6 (b), a first layer of thermopile junction metal or alloy 650 of the micromachined thermopile temperature sensor is deposited by an e-gun evaporation or a sputtering deposition through a lift-off process; and then a second layer of thermopile junction metal or alloy 660 of the micromachined thermopile temperature sensor is deposited by another e-gun evaporation or sputtering deposition through another lift-off process. And then a thin layer of chromium with a thickness of 100 A and a layer of gold with a thickness of 2000 A are deposited by another lift-off process as the interconnection and bonding pads 670.

In the FIG. 6 (c), the micromachined thermopile temperature sensor is passivated by deposited a layer of PECVD low stress silicon nitride 680 with a thickness of 3000 A to 4000 A. And subsequently in the FIG. 6 (d), it depicts that a drying etching process is performed to make the open holes 710 on the suspending membrane and open windows 720 on boding pads for wire bonding process.

In the FIG. 6 (e), a deep reactive etching from the back side of the silicon wafer 600 as a silicon bulk etching to form a cavity 750 underneath. And the deep reactive etching will stop on the thermal grown silicon dioxide 610. As in the FIG. 6 (f), the thermal grown silicon dioxide 610 as the etching stop layer is etched away by a buffered oxide etchant to release the open holes 900 on the suspending membrane. And the active junctions 800 are completely formed on top of the suspending membrane while the reference junctions 850 are formed on top of the non-membrane region.

We claim:
1. A micromachined silicon thermal mass flow sensor with flow inception detection comprising:
a micromachined thermopile temperature sensor on a silicon substrate wherein the micromachined thermopile sensor are formed by an array of two serpentine-shaped dissimilar metals lines which are interlaced cross-joined; wherein the two dissimilar metals have high thermo-effects in two opposite polarity; wherein first set of junctions of the thermopile sensor is called active junctions and located on top of a first suspended membrane with a cavity underneath while second set of junctions of the thermopile sensor is called reference junctions and located on top of a non-membrane area where has no cavity underneath as to stay in ambient temperature by keeping good thermal conductivity to the silicon substrate; and wherein once a temperature variation is enduring between the first set and the second set of junctions, a differential voltage summed across the array will be generated;
a heater thermistor which is located on a second suspended membrane with another cavity underneath and connected to a constant temperature control circuit;
a reference thermistor which is located on the non-membrane area of the silicon substrate and connected with the heater thermistor as part of the constant temperature control circuit thus to provide a constant temperature control for the heater thermistor;
a first temperature sensing thermistors which is disposed on the second suspending membrane and located on an upstream position beside the heater thermistor corresponding to gas flow direction; and
a second temperature sensing thermistors which is disposed on the second suspending membrane and located on an downstream position beside the heater thermistor corresponding to gas flow direction; wherein the first and the second temperature sensing thermistors are connected to a second electronic circuit to measure temperature variation between the first and the second temperature sensing thermistors thus to measure flow speed.
2. The micromachined silicon thermal mass flow sensor with flow inception detection of claim 1 wherein
the micromachined silicon thermal mass flow sensor is normally kept power off as a hibernating mode for the micromachined silicon thermal mass flow sensor to save electric power of battery and other external power source; wherein once gas flow is started which will cause temperature variation between the first and second set of junctions of the micromachined thermopile sensor, the generated voltage by the micromachined thermopile sensor will trigger to turn on power of the micromachined silicon thermal mass flow sensor and start flow measurement operation from the hibernating mode.
3. The micromachined silicon thermal mass flow sensor with flow inception detection of claim 1 wherein
the micromachined thermopile temperature sensor has open holes on its suspending membrane, which is used to balance the gas pressure above and below the spending membrane and to avoid breakage of the suspending membrane during a high flow or pressure measurement.
4. The micromachined silicon thermal mass flow sensor with flow inception detection of claim 1 wherein
the micromachined thermopile temperature sensor is connected in a serial way around four sides of the suspending membrane to maximize the number of the junctions.

5. The micromachined silicon thermal mass flow sensor with flow inception detection of claim 1 wherein
   the micromachined thermopile temperature sensor is positioned in an upstream location related to the heater thermistor of the micromachined thermal mass flow sensor to avoid interference from the heater thermistor.

6. The micromachined silicon thermal mass flow sensor with flow inception detection of claim 1 wherein
   the reference junctions of the micromachined thermopile temperature sensor should be as far away as possible from region of the suspending membrane.

7. The micromachined silicon thermal mass flow sensor with flow inception detection of claim 1 wherein
   the micromachined silicon thermal flow sensor will be shut off automatically if the micromachined thermopile temperature sensor has sensed no flow action for a period of time in flow channel.

8. The micromachined silicon thermal mass flow sensor with flow inception detection of claim 1 wherein
   the micromachined thermopile temperature sensor is formed first by a deposition of a thermal grown silicon dioxide with thickness of 2000 A to 3000 A and then a LPCVD low stress silicon nitride with a thickness between 7000 A to 10000 A on a silicon wafer.

9. The micromachined silicon thermal mass flow sensor with flow inception detection of claim 5 wherein
   the thermal grown silicon dioxide is utilized as an etching stop layer for deep reactive etching of cavity underneath the suspending membrane; and wherein the LPCVD low stress silicon nitride is utilized as the suspending membrane layer.

10. The micromachined silicon thermal mass flow sensor with flow inception detection of claim 5 wherein
    a first layer of thermopile junction metal or alloy of the micromachined thermopile temperature sensor is deposited by an e-gun evaporation or a sputtering deposition through a lift-off process; and wherein a second layer of thermopile junction metal or alloy of the micromachined thermopile temperature sensor is deposited by another e-gun evaporation or sputtering deposition through another lift-off process.

11. The micromachined silicon thermal mass flow sensor with flow inception detection of claim 5 wherein
    a thin layer of chromium with a thickness of 100 A and a layer of gold with a thickness of 2000 A are deposited by another lift-off process as an interconnection and bonding pads for the micromachined thermopile temperature sensor.

12. The micromachined silicon thermal mass flow sensor with flow inception detection of claim 5 wherein
    the micromachined thermopile temperature sensor is passivated by a deposition of an PECVD low stress silicon nitride with a thickness of 3000 A to 4000 A; and wherein a drying etching process is performed to make the open holes on the suspending membrane and open windows on boding pads for wire bonding process.

13. The micromachined silicon thermal mass flow sensor with flow inception detection of claim 6 wherein
    the micromachined thermopile temperature sensor is performed a deep reactive etching from the back side of the silicon wafer as a silicon bulk etching; and wherein the deep reactive etching will stop on the thermal grown silicon dioxide.

14. The micromachined silicon thermal mass flow sensor with flow inception detection of claim 6 wherein
    the thermal grown silicon dioxide as the etching stop layer is etched away by a buffered oxide etchant to release the open holes on the suspending membrane.

\* \* \* \* \*